United States Patent [19]

Fanning

[11] Patent Number: 4,758,386
[45] Date of Patent: Jul. 19, 1988

[54] WAVE-SHAPED AC ARC FOR LENSING SYSTEM

[76] Inventor: John W. Fanning, 401 Pennsylvania St., Lansdale, Pa. 19446

[21] Appl. No.: 3,970

[22] Filed: Jan. 15, 1987

[51] Int. Cl.$^4$ .............................................. B29D 11/00
[52] U.S. Cl. ...................... 264/1.5; 264/26; 264/27; 425/174.6; 425/174.8 E
[58] Field of Search ............. 264/1.4, 1.5, 25, 26, 264/27; 425/174, 174.6, 174.8 E

[56] References Cited

U.S. PATENT DOCUMENTS

| 2,184,740 | 12/1939 | Hansell | 373/4 X |
| 2,205,582 | 6/1940 | Steimel | 65/40 |
| 3,288,585 | 11/1966 | Clarke | 65/285 X |
| 3,684,474 | 8/1972 | Chisholm | 65/112 X |
| 4,118,270 | 10/1978 | Pan et al. | 264/1.5 |
| 4,345,930 | 8/1982 | Basola et al. | 264/1.5 |
| 4,349,497 | 9/1982 | Blackington | 264/1.5 |
| 4,510,005 | 4/1985 | Nijman | 264/1.5 |
| 4,589,897 | 5/1986 | Mathyssek | 65/10.2 X |

FOREIGN PATENT DOCUMENTS

| 58-136008 | 8/1983 | Japan | 65/10.2 |
| 59-7303 | 1/1984 | Japan | 65/10.2 |

OTHER PUBLICATIONS

"Fusion Mass Splices for Optical Fibers Using High-Frequency Discharge", *Journal of Lightwave Technology*, vol. L+2, #1, Feb. 1984, Tachikura et al., pp. 25-31.

*Primary Examiner*—Frank Sever
*Attorney, Agent, or Firm*—T. L. Peterson

[57] ABSTRACT

A system is provided for forming an end of an optical fiber into a lens, using a high frequency AC electric arc of predetermined frequency, which avoids the creation of harmonic frequencies that could degrade the finished lens. An arc is established between a pair of electrodes, wherein the arc current varies substantially sinusoidally, to minimize the amplitude of harmonic frequencies. Voltage pulses are delivered to a primary of a transformer, while the secondary of the transformer is coupled through a capacitor to one electrode, and the other electrode is coupled back to the secondary of the transformer. The inductance of the secondary winding plus the reflected inductance of the primary winding, when combined with the capacitance, results in a resonant circuit, which generates a sinusoidal output when excited at its resonant frequency. The square waves inputted to the transformer primary are at a frequency approximately equal to the resonant frequency of the resonant circuit.

8 Claims, 2 Drawing Sheets

WAVE-SHAPED AC ARC FOR LENSING SYSTEM

BACKGROUND OF THE INVENTION

Optical fibers can be coupled by melting their ends into lenses and placing the lenses in alignment and a predetermined distance apart. Lenses of fairly uniform size and high strength can be formed by placing a pair of electrodes on opposite sides of an optical fiber end portion and establishing an arc between the electrodes that melts the fiber portion between them. The arc can be more closely controlled by repeatedly turning it on and off, and especially by establishing an alternating current, or AC, arc of a high frequency such as 75 kHz. A low-cost power supply which can generate a relatively high frequency such as 75 kHz of substantial current such as 30 milliamperes at a considerable voltage is a DC source which is switched on and off at the desired frequency. This produces pulses or square waves, which may be amplified by passage through a transformer. The output of such a circuit may be somewhat like a square wave. While a largely square wave at the desired frequency can produce a closely controlled arc, it can result in creation of large undesirable vibrations of the optical fiber. Resonant vibration of the optical fiber, especially of the molten ball of glass as it is hardening, can degrade the quality of the lens. The optical fiber may have a diameter of about 0.005 inch, with the lens being only about 50% greater in diameter, and is subject to resonant vibrations at high frequencies.

Uniformity of lens size can be controlled to a large extent by controlling the voltage across the electrodes and the period during which the arc is maintained. However, fiber heating and consequent lens size and position can be affected by the particular atmospheric conditions.

A system for forming a high frequency arc, which minimized the possibility of creating high frequency resonant vibrations in the optical fiber, with the system being relatively simple and of low cost while closely controlling the melting of the optical fiber, would be of considerable value.

SUMMARY OF THE INVENTION

In accordance with one embodiment of the present invention, an apparatus and method are provided for generating a high frequency electric arc to melt an end portion of an optical fiber into a lens, which avoids the creation of unwanted high frequencies that could deliteriously affect the lensed fiber. The current of the high frequency arc varies substantially sinusoidally, to avoid the creation of harmonics that might have a frequency close to a resonant mode of the optical fiber, and especially to the molten glass as it is formed into a lens.

A relatively simple circuit for generating the substantially sinusoidally varying current includes a transformer and a source of voltage pulses coupled to the primary of the transformer. One terminal of the transformer secondary is coupled through a capacitor to an electrode lying on one side of the optic fiber. A second electrode on the other side of the fiber is coupled to another terminal of the transformer secondary. The inductance of the transformer plus the capacitance of the capacitor produce a resonant circuit having a predetermined resonant frequency. The pulses delivered to the transformer primary are of a frequency substantially equal to the resonant frequency of the resonant circuit.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
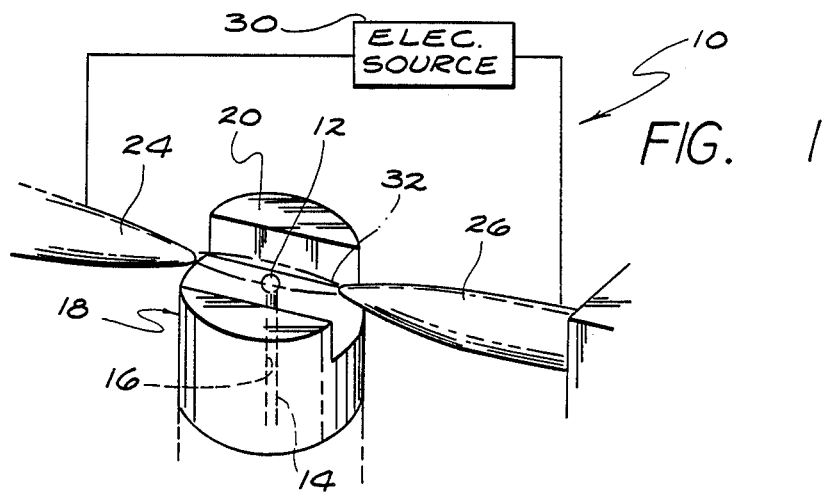
FIG. 1 is a partial perspective view of apparatus for lensing an optical fiber.

FIG. 1 illustrates a system 10 which can be used to form a lens 12 at the end of an optical fiber 14. The fiber is inserted through a longitudinal hole 16 of a contact 18 and fixed in place, with an end portion of the fiber lying about even with the top 20 of the contact. The contact has a cross-aperture 22 near its end, in which most of the fiber end portion lies. A pair of electrodes 24, 26 are positioned on opposite sides of the optical fiber end portion, in alignment with the cross-aperture. An electrical source 30 is activated to produce a voltage between the electrodes, which results in the creation of an electric arc 32 between the tips of the electrodes, which passes across the fiber end portion to melt it. Afterwards, the contact 18 with the lensed fiber thereon can be placed with its tip 20 in abuttment with another contact, to couple light from a fiber in one contact to the fiber in the other contact.

Figure 2:
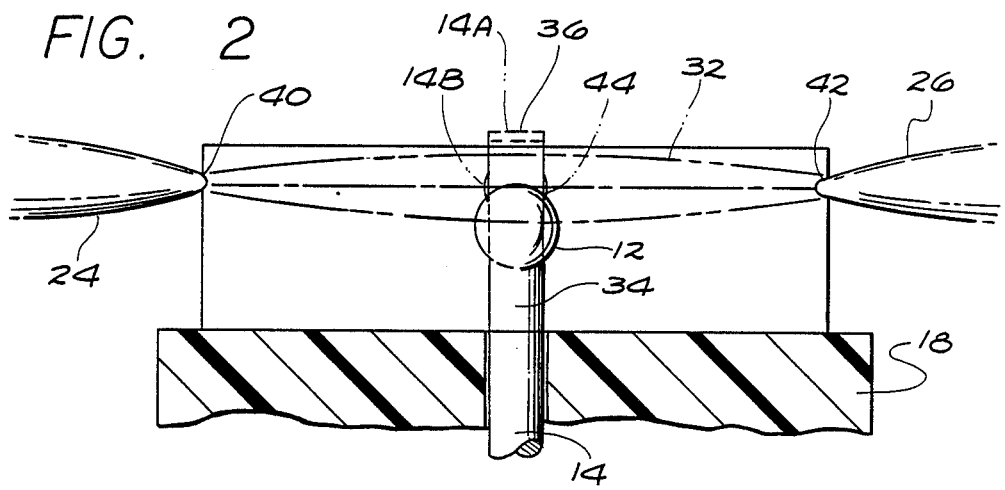
FIG. 2 is a side elevation view of a portion of the apparatus of FIG. 1, showing the optical fiber during three stages of the formation of a lens thereon.

FIG. 2 illustrates an optical fiber end portion 34 during the process of forming it into a lens. The optic fiber at 14A is positioned with its extreme forward end 36 slightly above the location at 32 where the brightest portion of the arc occurs. The arc is established between a pair of electrode tips 40, 42 and initially melts a location 44 below the fiber tip, to place the fiber in the configuration 14B. The tip of the fiber falls into the molten ball, as the ball descends and grows, until it reaches the position shown at 12. The arc is stopped at or slightly before that time, and the molten ball of glass hardens to form the lens 12. The three most common optical fiber sizes are 125 um (micrometers), 140 um, and 250 um with the lenses having a diameter about 50% greater than the optic fiber diameter.

Electric arcs have been used to splice pairs of optical fibers, by heating the fibers while their ends are in contact to melt them into one another. Such arcs were then tried for melting optic fiber ends sufficiently to form lenses thereon. At first, DC arcs were used, which were difficult to control, and then relatively low frequency (e.g., 60 Hz) arcs were used. It was found that better reproducibility and lower voltages could be used by establishing arcs of relatively high frequency, with applicant prefering a frequency such as 75 kHz. For optic fiber of diameters ranging from 0.005 to 0.010 inch described above, arc currents of about 10 to 40 milliamperes (root mean square) continued for a period of 3 to 6 seconds, have been found effective to melt the fiber into a lens. A separation S of electrode tips of about 0.060 inch was found to provide sufficient separation to avoid the buildup of glass on the tips, while enabling a moderate voltage to be used to establish and maintain the arc. A voltage of about 10,000 volts is required to establish the arc, and a voltage of about 700 volts (peak-to-peak) is required to maintain an arc current of about 20 milliamperes (root mean square). This range of current is considerably greater than used for splicing of optic fibers, and the voltage is also greater (because of a greater electrode separation).

If a low voltage and current were sufficient, a high frequency source could be produced by a sinusoidal oscillator, whose voltage output can be increased by passing it through a transformer (with a consequent decrease in current). Where a larger high frequency power output is required, a simple electricity source includes a DC voltage source whose output is repeatedly connected and disconnected from the electrodes to produce a sequence of pulses or square waves of the desired frequency (e.g., 75 kHz). The output voltage can be boosted (e.g., to 700 volts) by passing it through a transformer, and a high arc-initiation voltage (e.g., 10 kilovolts) can be produced through a voltage multiplier.

While a sequence of pulses can produce a controlled arc which will form the end of an optical fiber into a lens, there is potential for degradation of the lens. The optic fiber end portion, like other devices, has many resonant modes at which it will experience large vibrations when excited at moderate amplitudes. Since the most common optic fibers and their lenses are small, the resonances occur at high frequencies. A pulse repeated at a predetermined frequency such as 75 kHz produces harmonics of high amplitudes, throughout a wide frequency range. There is a significant possibility that one of these harmonics of high amplitude will be close to a resonant frequency of the optic fiber. This could be especially deliterious if a strong harmonic is near a resonant frequency of the molten glass ball as it is hardening into a solid lens, since this could cause surface waves or other distortions of the lens, which could degrade its performance. Applicant avoids the presence of numerous high frequency components in the arc, by using an arc which is substantially sinusoidal most of the time, especially near the end of the period of the arc. A sinusoidal wave has no harmonics, and a substantially sinusoidal wave has harmonics of very low amplitude, which will avoid large vibrations of the optic fiber even if they occur at a resonant frequency of the optic fiber.

Figure 3:
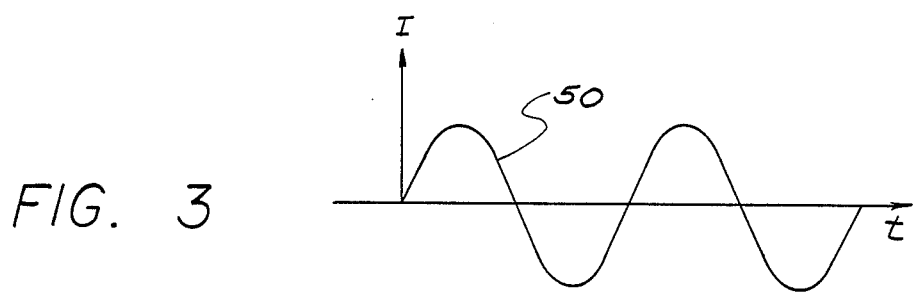
FIG. 3 is a graph showing the variation of current with time for the arc of FIG. 2.

FIG. 3 illustrates a waveform 50 showing the variation of applicant's arc current with time, and showing that the current varies substantially sinusoidally to minimize the amplitude of harmonics. It may be noted that throughout numerous tests on optical fibers having diameters in the range of about 0.005 to 0.010 inch, no resonances were observed or deliterious effects found for arc frequencies of about 75 kHz.

Figure 4:
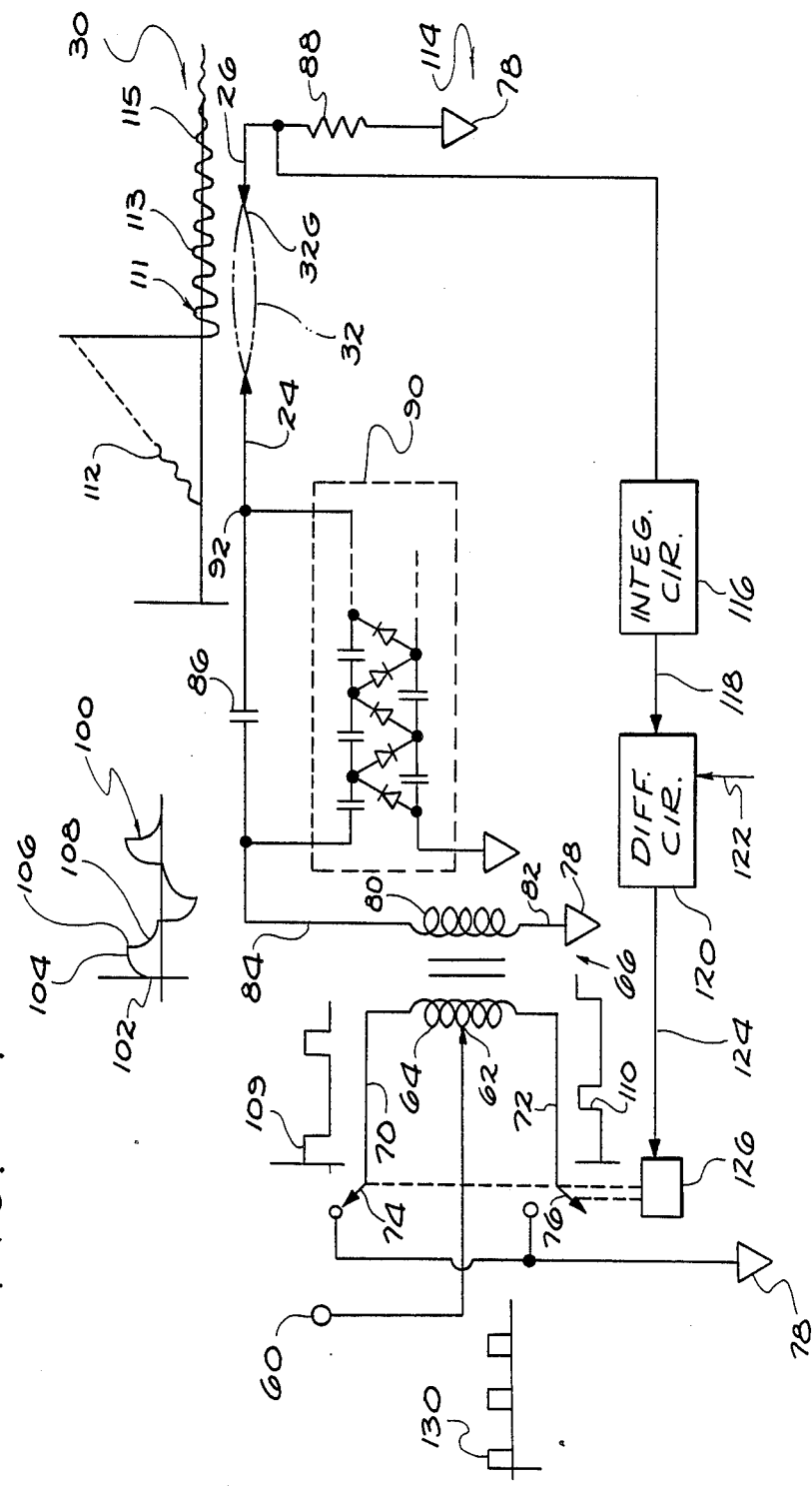
FIG. 4 is a simplified schematic diagram of a circuit of the apparatus of FIG. 1.

FIG. 4 is a simplified circuit diagram showing how applicant is able to produce a substantially sinusoidal high frequency arc of considerable voltage and current, using relatively low-cost circuitry. The circuit includes a DC voltage source 60 of moderate ripple such as can be obtained by rectifying commonly available 110 volt, 60 cycle current, and partially smoothing it, all in a relatively simple well-known type of circuit. The output of the source 60 is connected to a terminal 62 of the primary winding 64 of a transformer 66. Two other terminals 70, 72 of the primary winding are connected through switches 74, 76 to ground 78. The secondary winding 80 of the transformer has one terminal 82 that is grounded, and another terminal 84 that is connected through a capacitor 86 to one of the arc-producing electrodes 24. The other electrode 26 is connected through a load resistance 88 to ground at 78, or in other words is connected to the secondary winding terminal 82.

The transformer is used not only to increase the voltage input, but also its inductance is used in combination with the capacitance of the capacitor 86 to form a resonant circuit which is resonant at a predetermined frequency. The inductance of the transformer equals the inductance of the secondary winding 80 and the reflected inductance of the primary winding 64. When a voltage close to the resonant frequency of the resonant circuit is impressed on it, a resonance is created which results in the sustaining of a relatively high voltage in the circuit, which varies substantially sinusoidally. The capacitor 86 is chosen so that the resonant frequency of the resonant circuit is approximately equal to the desired frequency (e.g., 75 kHz) of the arc, which is also approximately the frequency at which the switches 74, 76 are cycled. As discussed above, the maintenance of a substantially sinusoidal current in the arc is useful in avoiding large amplitude resonances in the optical fiber when it is being melted to lens it.

When an arc is to be established, a high voltage such as 10,000 volts must be impressed across the electrodes to break down the atmosphere and ionize it. Although the arc must be reestablished at intervals of about 150 kHz, a high voltage is not necessary to reestablish the arc, because the ionized atmosphere remains during the brief period between termination and reestablishment of the arc. Applicant uses a known type of voltage multiplier circuit 90, which includes multiplying capacitors 91 in series and divides 93 for repeatedly charging them, to build up the voltage at point 92 (over perhaps 100 cycles lasting about 0.001 second) to a voltage at which the atmosphere between the electrodes breaks down to establish the arc. The resistance through the arc gap 32G then becomes low, which prevents a further buildup of voltage, and the voltage multiplier 90 does not serve any purpose during the rest of the few seconds during continuation of the arc. Thereafter, the sinusoidal oscillations of the resonant circuit produced a substantially sinusoidal arc current.

It may be noted that the voltage at the secondary winding terminal 84 has a shape of the type shown at 100, wherein at the beginning of a positive-going pulse, the voltage has a rapid increase at 102. Then, at 104 the transformer operates in a fly-back mode wherein its inductance causes the voltage to rise exponentially. At 106 when the input pulse suddenly drops to zero, the transformer output suddenly decreases, and then at 108 decreases exponentially towards zero. A similar negative-going voltage appears during the following negative pulse at the input to the transformer. The graphs 109, 110 show the input voltage at corresponding times. The graph 111 shows the voltage across the arc gap, which includes an initial rising portion 112, a sinusoidal portion 113 which last during most of the arc time of about 5 seconds, and a gradual decay portion 115. The gradual decay portion 115 (whose decay depends on the "Q" of the resonant circuit) avoids resonant vibrations in the molten ball of fiber just as it starts cooling into a lens.

In order to melt each of numerous optical fibers into lenses that are all of closely the same size, it is necessary that the "amount" of current during a predetermined time such as 5 seconds be the same for every fiber. However, the integral of current over a predetermined time period could vary due to the differences in local conditions such as the humidity of the atmosphere or the exact placement of a fiber and contact relative to the electrodes. To assure uniformity, applicant uses a feedback circuit 114 to maintain a predetermined integral or current with time.

The feedback circuit 114 includes the resistor 88 and the terminal 115 on the side of the resistor opposite ground, which senses the amount of arc current by the voltage across the resistor. The voltage at 115 is delivered to an integrating circuit 116 which produces a voltage output on line 118 proportional to the integral of current with time over a period of at least one cycle, lasting one seventy-five thousandth of a second (or preferably a few cycles). The voltage at 118 is delivered to a difference circuit 120 which compares the voltage on line 118 to a predetermined voltage delivered on line 122 which represents the desired average current. The difference is represented by a signal on line 124 which is delivered to a switch controller 126. The switch controller 126 uses the difference to adjust the time during which each switch 74, 76 is closed. If the integral current (line 118) is less than the predetermined amount (line 122), then the time period during which each switch is closed is increased slightly, while if the integral current is too great, then the period during which each switch is closed is reduced. In this way, the arc current is maintained at a predetermined average level during a predetermined time, regardless of variations in impedance between the electrodes. When the duration of the pulses to the primary, indicated at 130, are reduced, this results in a lower voltage and current input to the electrodes, but does not substantially change the sinusoidal characteristics of the current.

For an optical fiber of a diameter of 125 micrometers lying in a contact and electrodes spaced 0.060 inch apart, applicant has found that the application of a sinusoidal arc current of about 20 milliamperes (root mean square) for a period of about 4 seconds produces a lens of the desired diameter of about 190 micrometers. The sinusoidal arc current at a frequency of about 75 kHz has been found to produce lenses of consistent diameters and positions on the contacts.

Thus, the invention provides a method and apparatus for producing an electric arc for melting an optical fiber into a lens, which avoids the creation of difficult-to-predict resonances in the fiber during the melting thereof. This is accomplished by maintaining a varying arc, which varies substantially sinusoidally to avoid harmonics of large amplitude. The sinusoidal current is produced in a relatively simple circuit, by applying pulses to the primary of the transformer and coupling the secondary of the the transformer through a capacitor to an electrode, with the other electrode coupled to the other side of the secondary winding of the transformer. The inductance of the transformer and capacitance of the capacitor are chosen which have a resonance at the desired frequency, and the pulse input to the primary of the transformer is at substantially that resonant frequency. The arc current is sensed, and the period of duration of each pulse delivered to the transformer primary winding is adjusted to maintain a predetermined integral of current with time.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus comprising: means for forming an end portion of an optical fiber into a lens, while minimizing the creation of high frequency resonant vibrations, including,
   a pair of electrodes which have spaced tips;
   means for holding an optical fiber end portion 5 between said electrode tips;
   means for establishing an arc whose current varies substantially sinusoidally with time at a substantially predetermined frequency between said electrode tips, so the arc passes across said fiber end portion to melt in into a lens.

2. The apparatus described in claim 1 wherein said means for establishing an arc includes:
   a transformer having primary and secondary windings, said secondary winding having first and second terminals;
   means for applying pulses to said primary winding;
   means defining a capacitor coupling the first terminal of said secondary winding to one of said electrodes;
   means coupling the other of said electrodes to the second terminal of the secondary winding;
   the inductance of said secondary winding and the reflected inductance of said primary winding, together with said capacitance defining a resonant circuit of a predetermined resonant frequency;
   said pulse applying means being constructed to apply pulses at a rate substantially equal to said resonant frequency.

3. Apparatus comprising: means for forming an end portion of an optical fiber into a lens, while minimizing the creation of high frequency resonant vibrations, including,
   means for establishing an arc whose current varies substantially sinusoidally with time at a predetermined frequency between said electrode tips, so the arc passes across said fiber end portion to melt it to a lens, said means comprising,
   a transformer having primary and secondary windings, said secondary winding having a pair of terminals;
   means for applying pulses of current to said primary winding;
   a capacitor;
   means for connecting a first of said terminals of said secondary winding through said capacitor to a first of said electrodes;
   means for connecting a second of said terminals of said secondary winding to the second of said electrodes;
   said transformer and capacitor forming a resonant circuit which is resonant at a predetermined frequency, and said means for applying pulses is constructed to apply pulses of a frequency substantially equal to the resonant frequency of said resonant circuit.

4. The apparatus described in claim 3 including:
   means for sensing current flow between said electrodes; and wherein
   said means for applying pulses including means responsive to the current sensed by said current flow sensing means, for varying the duration of said pulses to maintain a predetermined average current flow between said electrodes.

5. The apparatus described in claim 3 including:

a voltage multiplying circuit connected between opposite sides of said first-mentioned capacitor, said multiplying circuit being of a large type which includes a plurality of multiplier capacitors connected in series and a plurality of diode means for repeatedly charging said multiplier capacitors until the voltage across said first-mentioned capacitor reaches a level at which an initial arc is formed between said electrode tips.

6. A method comprising forming an end portion of an optical fiber into a lens, while minimizing the creation of high frequency resonant vibrations by, establishing and maintaining an alternating current arc across said optical fiber end portion and continuing said arc for a predetermined period of time, to melt said fiber end portion into a lens, and then allowing the molten end portion to cool and harden;

said step of continuing said arc including varying the arc current substantially sinusoidally, sufficient to avoid harmonics that may be resonant to the molten fiber end portion.

7. The method described in claim 6 wherein:

said step of establishing and maintaining an arc includes delivering a series of pulses to a primary of a transformer;

coupling one side of the secondary of the transformer through a capacitor to the other side of the secondary a path which includes said arc;

said capacitor and transformer forming a resonant circuit, and the frequency of said pulses being substantially equal to the resonant frequency of said resonant circuit.

8. The method described in claim 7 including:

sensing the integral of arc current with time and varying the duration of said pulses to maintain a predetermined average arc current.

* * * * *

UNITED STATES PATENT AND TRADEMARK OFFICE
CERTIFICATE OF CORRECTION

PATENT NO. : 4,758,386

DATED : July 19, 1988

INVENTOR(S) : John W. Fanning

It is certified that error appears in the above-identified patent and that said Letters Patent is hereby corrected as shown below:

On the title page Assignee should read:

--Assignee: ITT Corporation,
           New York, N.Y. --.

Signed and Sealed this

Eleventh Day of April, 1989

Attest:

DONALD J. QUIGG

*Attesting Officer*   *Commissioner of Patents and Trademarks*